United States Patent [19]

Bowen

[11] Patent Number: 5,023,903
[45] Date of Patent: Jun. 11, 1991

[54] IMPROVED VOICE & DATA TELECOMMUNICATIONS APPARATUS

[76] Inventor: Frederic W. Bowen, 518 N. Waterman St., Arlington Heights, Ill. 60004

[21] Appl. No.: 376,750

[22] Filed: Jul. 7, 1989

Related U.S. Application Data

[63] Continuation-in-part of Ser. No. 192,103, May 9, 1988, abandoned.

[51] Int. Cl.$^5$ .................... H04M 1/64; H04M 11/00
[52] U.S. Cl. ......................................... 379/67; 379/93; 379/97; 379/98
[58] Field of Search ..................... 379/93, 96, 97, 98, 379/100, 102, 104, 105, 67, 88

[56] References Cited

U.S. PATENT DOCUMENTS

| | | | |
|---|---|---|---|
| 4,009,342 | 2/1977 | Fahrenschon | 379/93 |
| 4,381,427 | 4/1983 | Cheal et al. | 379/93 |
| 4,479,195 | 10/1984 | Herr et al. | 364/900 |
| 4,488,003 | 12/1984 | Nishimura | 375/5 |
| 4,524,244 | 6/1985 | Faggin et al. | 379/93 |
| 4,546,212 | 10/1985 | Crowder, Sr. | 370/76 |
| 4,578,537 | 3/1986 | Faggin et al. | 379/93 |
| 4,596,021 | 6/1986 | Carter et al. | 379/98 |
| 4,656,654 | 4/1987 | Dumas | 379/93 |
| 4,660,218 | 4/1987 | Hashimoto | 379/93 |
| 4,677,660 | 6/1987 | Yoshida | 379/100 |

Primary Examiner—Thomas W. Brown

[57] ABSTRACT

Apparatus for transmitting analog voice and data communications on a phone line utilizing a telephone, a data terminal and a modem, the modem being connected to the data terminal. The apparatus comprises a mode switch for connection to the phone line, to the modem and to the telephone, the mode switch having at least first and second positions. When in the first position, the phone line is connected to the modem and when in the second position the phone line is connected to the telephone. A controller is connected to the mode switch for placing the mode switch in the first position or in the second position. A data transition tone generator is connected to the controller and to the phone line, and an actuator is provided for actuating the tone generator to produce a tone signal on the phone line at substantially the time that the contoller changes the position of the mode switch. Apparatus may further include a record/playback unit connected to the telephone lead and controller such that the controller may direct it to answer a call, playback a message, record when the phone is connected to the phone line, and stop recording when the telephone is not connected to the phone line.

26 Claims, 8 Drawing Sheets

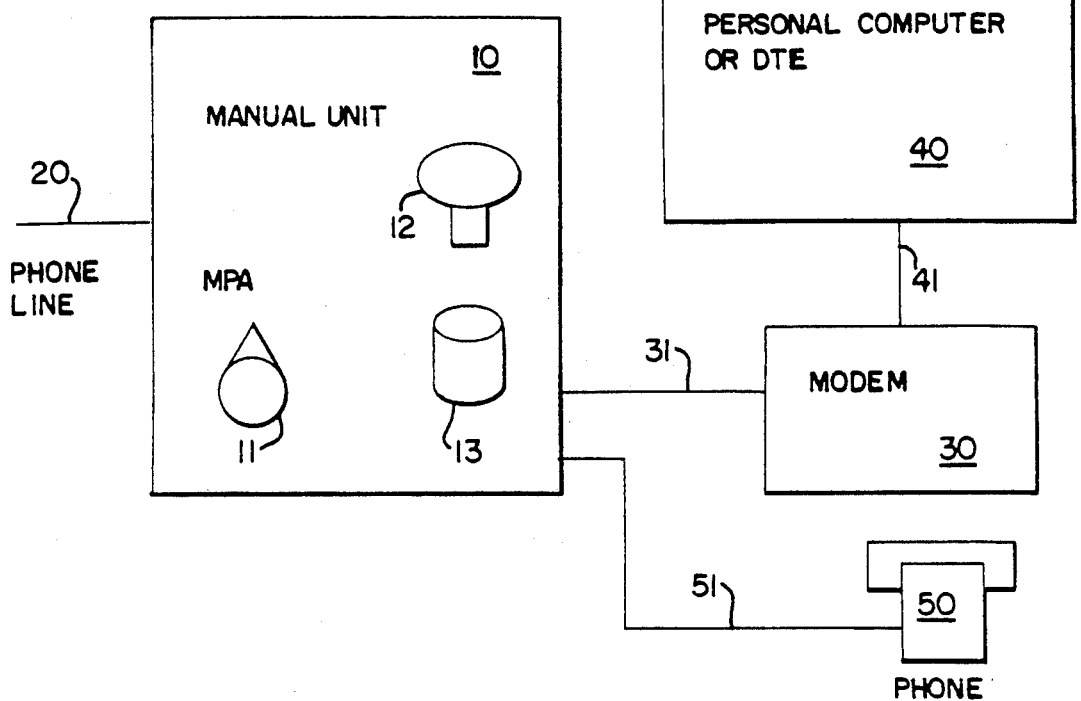
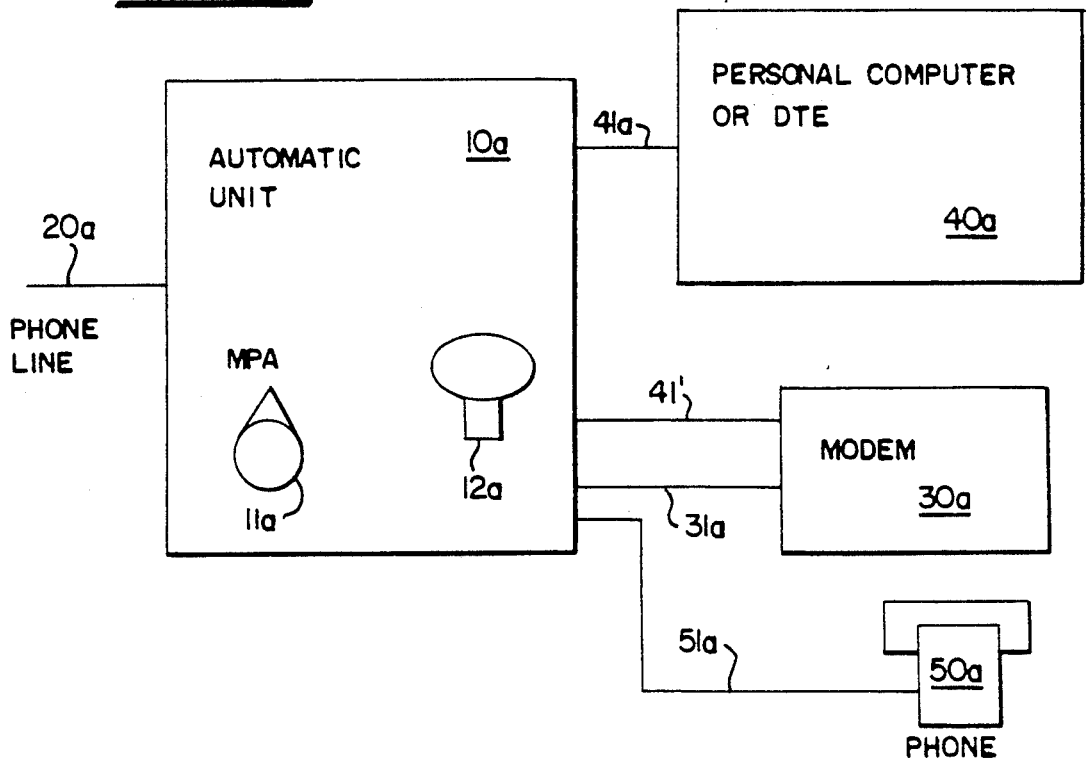

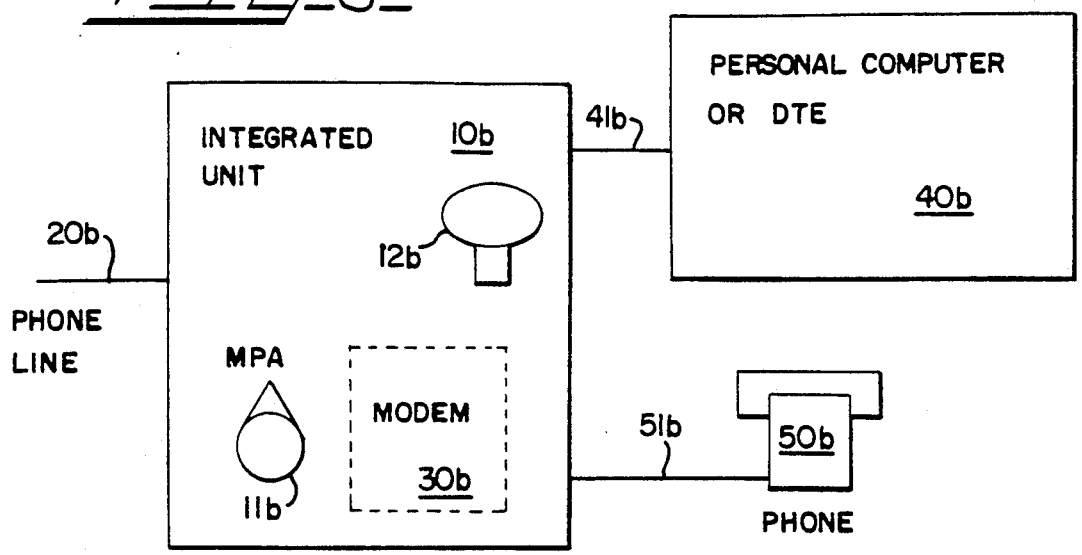
FIG-3-
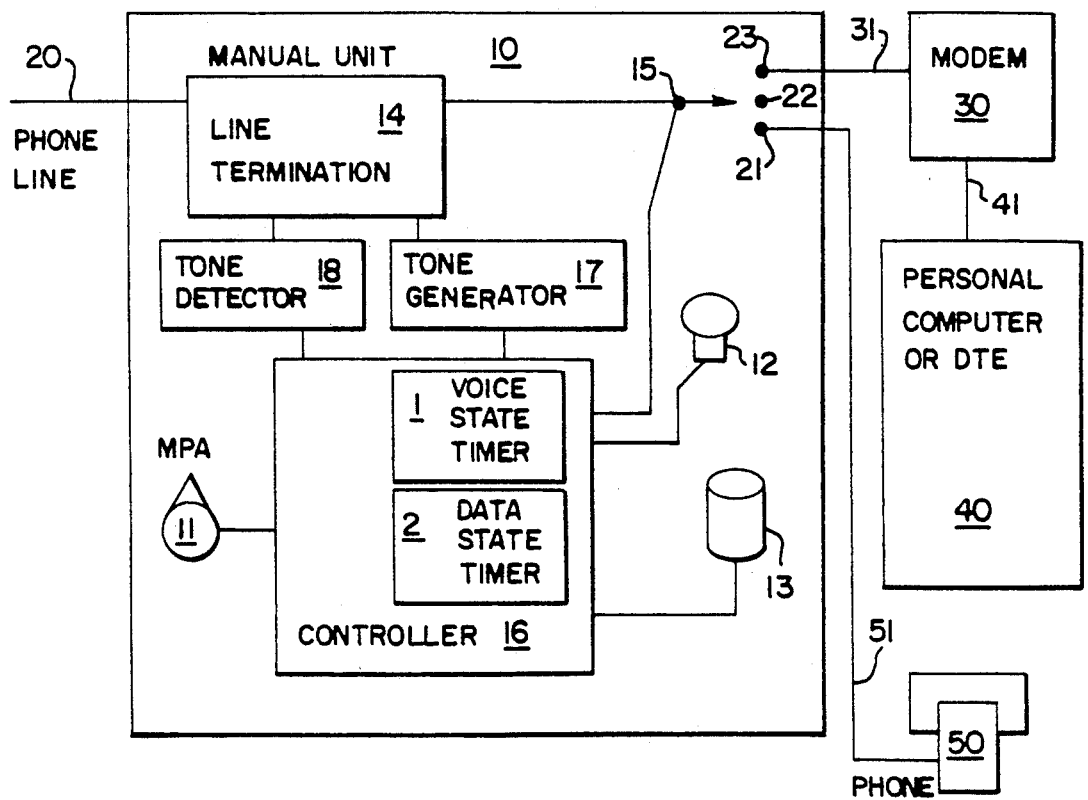
FIG-4-

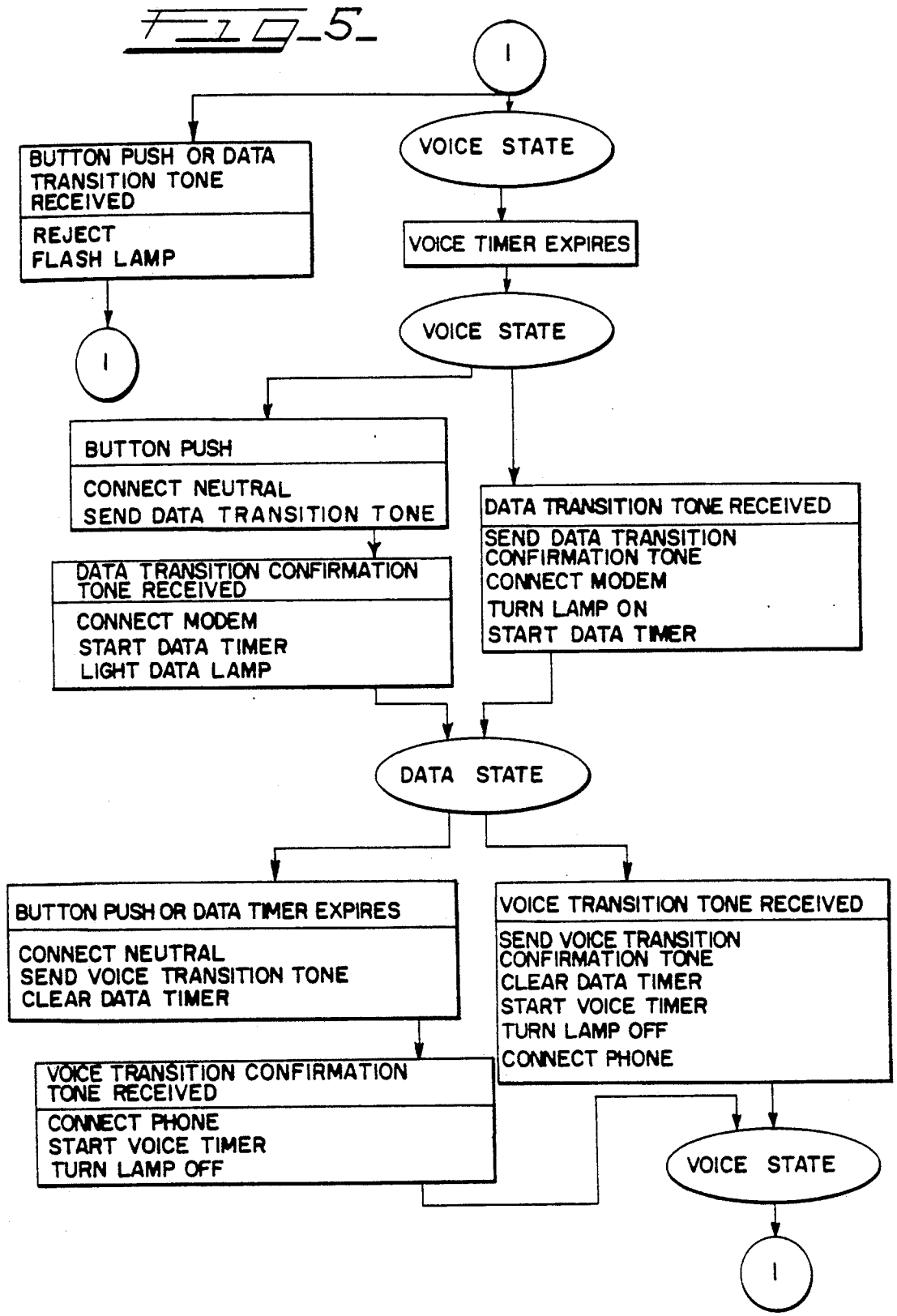

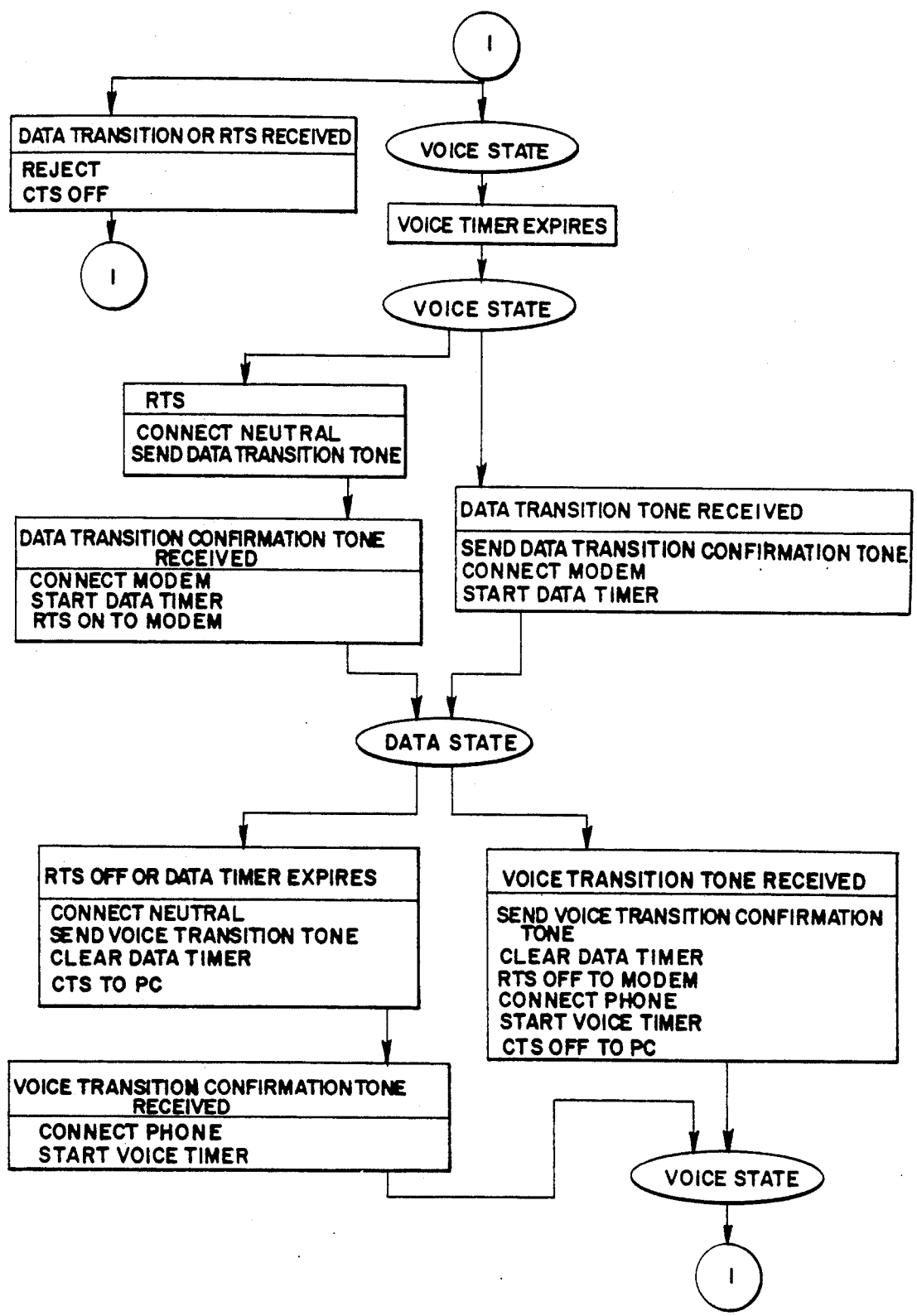

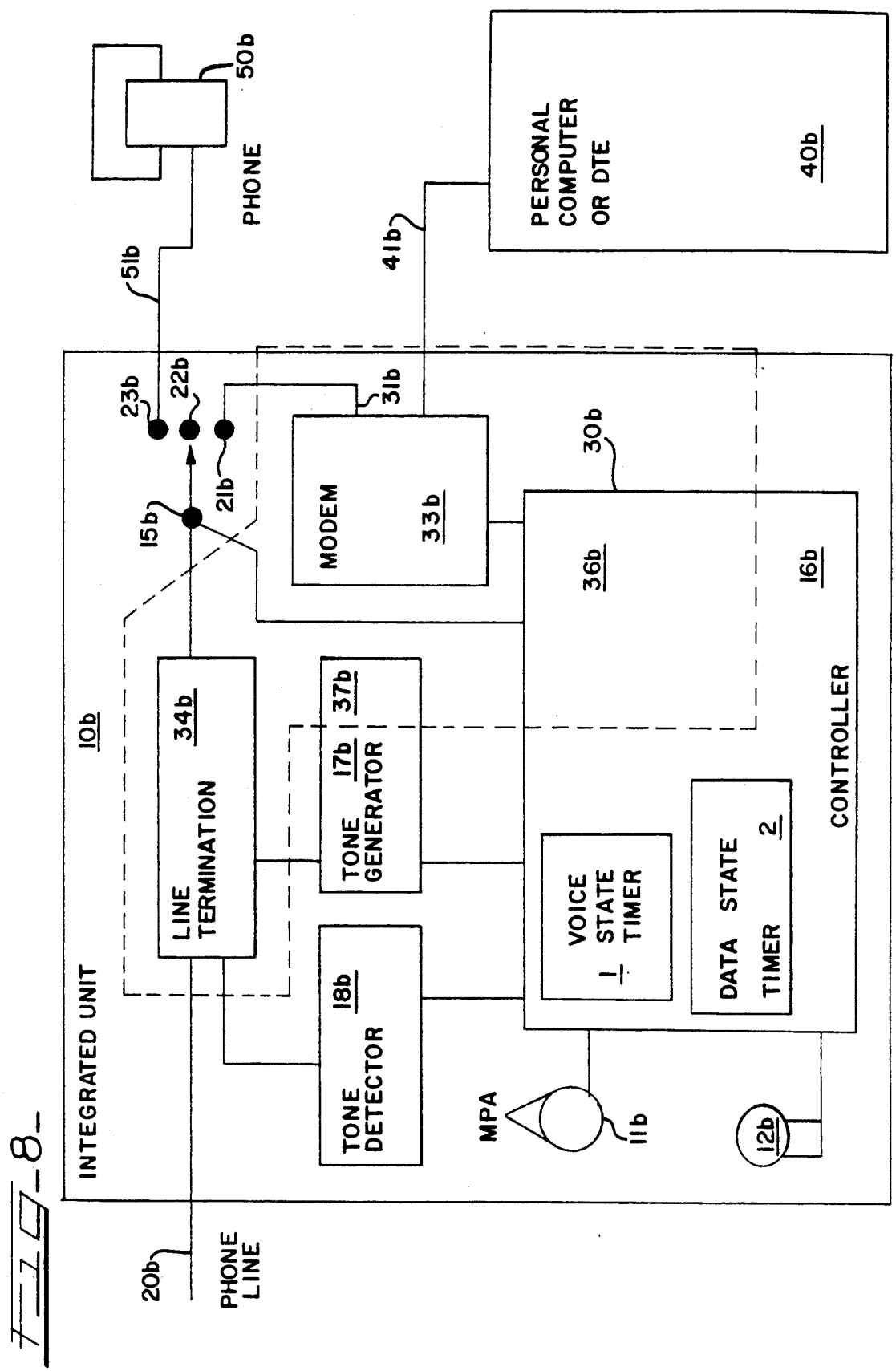

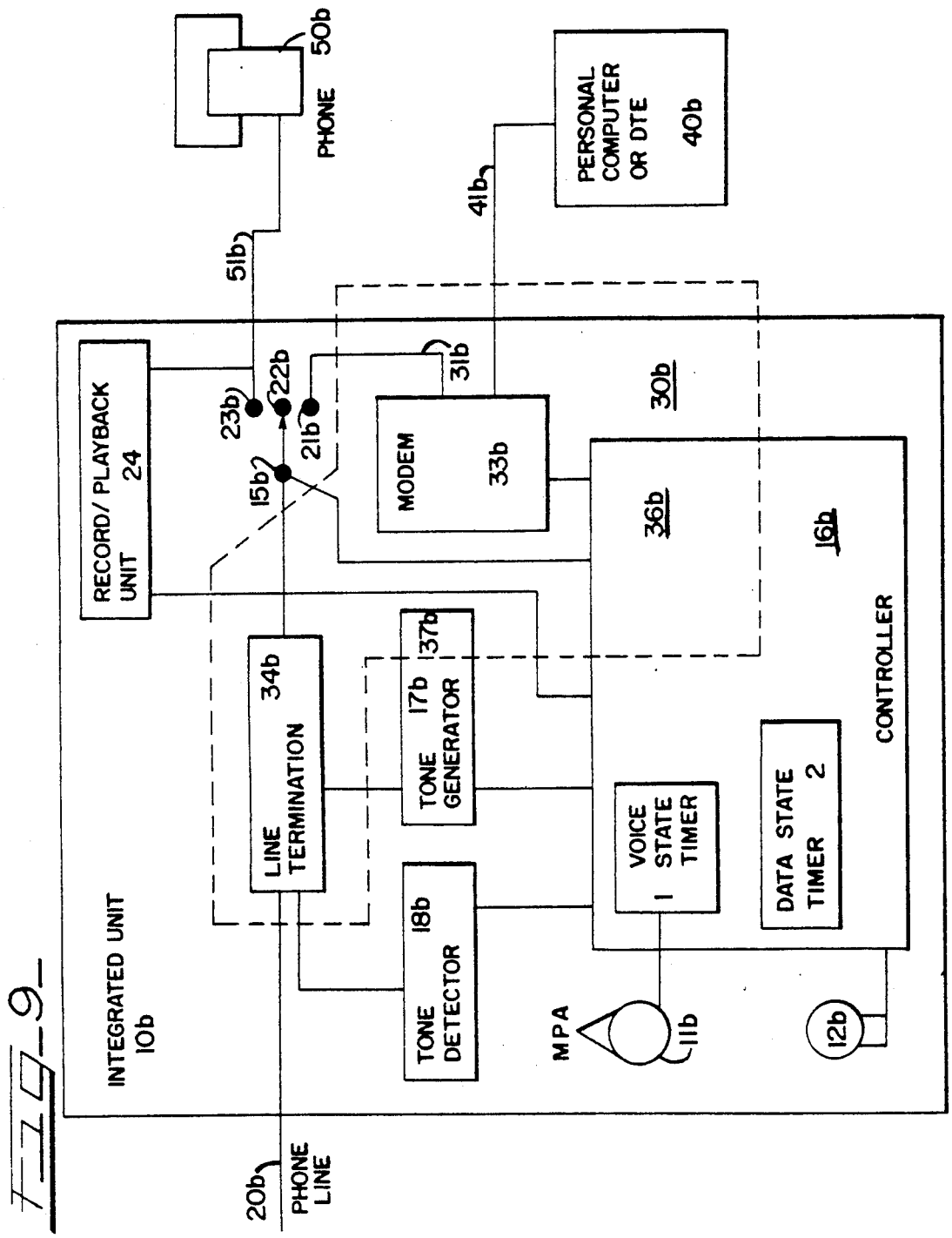

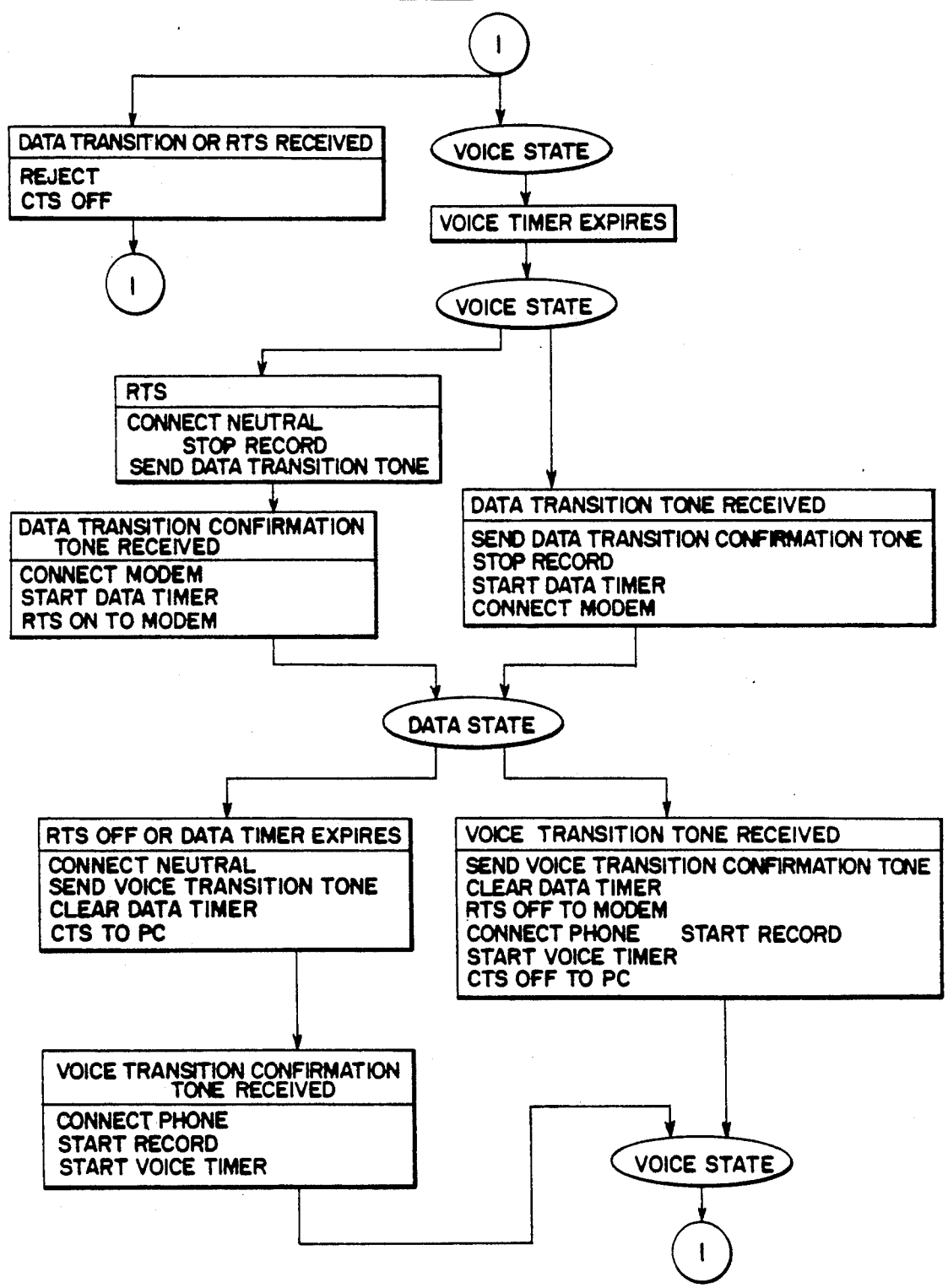

IMPROVED VOICE & DATA TELECOMMUNICATIONS APPARATUS

RELATED APPLICATION

This application is a continuation-in-part of pending application Ser. No. 192,103 filed on May 9, 1988, abandoned.

FIELD OF THE INVENTION

This invention relates generally to telephone communications, and more particularly to the integrated and coordinated communication of analog voice and data signals within the context of a single voice call through the Public Switched Network. It includes interfaces to personal computers or workstations, phones, and modems, and it also includes capabilities for the exchange of control information between the user equipment involved in the call. It may also include record and playback capabilities for voice communications when no voice answer occurs.

BACKGROUND OF THE INVENTION

Prior art for the exchange of audible and visual information has been known for some time. Typically, it requires the use of high capacity, special facilities such as videoconferencing, or includes multiple, time delayed steps such as using FAX and then placing a voice call, or other processes in which the voice and data are uncoordinated, and the data delays are of unknown magnitude, such as for packet data or electronic mail.

Other means for voice and data using a single circuit give no priority to voice, and depend on the presence and absence of carrier to detect transitions between voice and data, which result in solutions that include ambiguous states and are susceptible to errors due to network interruptions and crosstalk. Others require cumbersome user actions such as lifting and replacing a handset. These approaches also permit mixed modes in which one party may be in the voice state while the other is in the data state. Other approaches require special, complex control codes and impose timing delays and user data restrictions, or they require new complex control interfaces. These solutions also limit control and parameterization capabilities to the local modem and processor.

Prior art does not include the ability to provide combined data and answering machine functionality over a single unattended phone line.

The objectives of this invention are:
(1) to capitalize on the new high speed modem technology that can transfer a screen or file in a fraction of the time previously required,
(2) to build on and require no alterations of existing PC-modem physical interfaces or inter-modem protocols,
(3) to employ robust, coordinated voice and data transition signaling mechanisms free from ambiguities and interference caused by network interruptions and crosstalk that can occur with systems that depend on the presence or absence of carrier or other commonly used tones,
(4) to eliminate situations where the parties are in different modes or states of operation,
(5) to require no special, complex control codes and to impose no user data or timing restrictions,
(6) to optimize the human interface to give voice precedence, to ensure intelligible voice communications, to provide a visual status indication, and to require only those user actions currently needed to conduct voice and data activities.
(7) to provide extended control capabilities which can be employed between any two units involved in a voice/data call.
(8) to provide voice answering machine and data communications over the same unattended phone line.

SUMMARY OF THE INVENTION

Apparatus in accordance with this invention is for transmitting analog voice and data communications on a phone line utilizing a telephone, a data terminal and a modem, the modem being connected to the data terminal. The apparatus comprises a mode switch for connection to the phone line, to the modem and to the telephone, the mode switch having at least first and second positions. When in the first position, the phone line is connected to the modem and when in the second position the phone line is connected to the telephone. A controller is connected to the mode switch for placing the mode switch in the first position or in the second position. A data transition tone generator is connected to the controller and to the phone line, and an actuator is provided for actuating the tone generator to produce a tone signal on the phone line at substantially the time that the controller changes the position of the mode switch. Apparatus may further include a record/playback unit connected to the controller such that it may answer a call, and when the phone is connected to the phone line the controller actuates the unit to record. When the phone line is connected to the modem, the controller may direct the unit to stop recording.

BRIEF DESCRIPTION OF THE DRAWINGS

The invention will be better understood from the following detailed description taken in conjunction with the accompanying figures of the drawings, wherein:

FIG. 1 is a block diagram of a manual unit constructed in accordance with this invention;

FIG. 2 shows an automatic unit according to this invention;

FIG. 3 shows an integrated unit according to this invention;

FIG. 4 shows the manual unit of FIG. 1 in greater detail;

FIG. 5 is a flow diagram illustrating the operation of the manual unit;

FIG. 7 is a flow diagram illustrating the operation of the automatic unit;

FIG. 8 shows the integrated unit of FIG. 3 in greater detail;

FIG. 9 shows the integrated unit of FIG. 8 including the record/playback unit; and FIG. 10 is a flow diagram illustrating the operation of the integrated unit when in the answer mode.

DETAILED DESCRIPTION OF THE DRAWINGS

Figure 6:
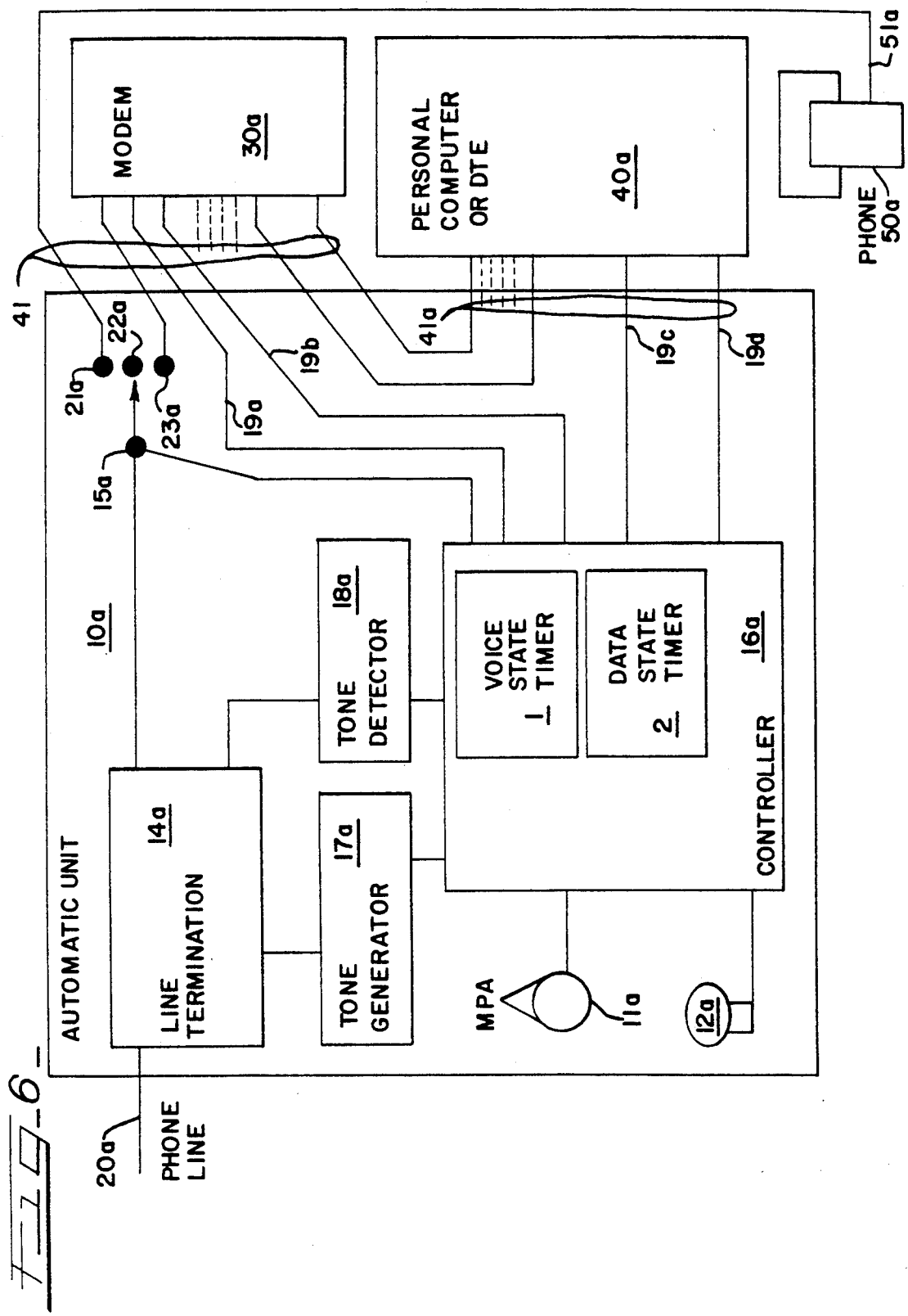
FIG. 6 shows the automatic unit of FIG. 2 in greater detail.

As shown in FIGS. 1, 2 and 3, there are three preferred embodiments of this invention, each of which is tailored to meet slightly different environments and applications. They are referred to herein as the manual unit, the automatic unit and the integrated unit. FIGS. 1 to 3 show the configuration of the units with associated phone lines, modems, phones, and PCs or data terminals. Also shown are the modem connections, phone connections and PC, or data terminal, connections. For the automatic unit, there is also an additional PC/modem connection.

All of the units are constructed of conventional readily available components that are already in use in numerous products. Circuitry simplificiations have been used occasionally to focus on the basic components and innovations presented here.

Alternative embodiments involving slight modifications to the specific examples shown in the drawings may be possible, and are considered to fall within the breadth of this invention. Such modifications may be a result of cost reduction or simplification efforts.

Manual Unit

The manual unit may be used with any modem and PC, and places no signaling or control requirements on either the modem or PC. The modem and PC can transparently perform data communications when in the data state, as if the unit were not part of the configuration. There are no special codes or user data restrictions. No special interfaces, protocols or signals are required for either the modem or the PC. Similarly, when in the voice state, voice communications proceed as if the unit were not present.

FIGS. 1 and 4 show the configuration for the manual unit 10 which terminates a phone line 20 and provides a modem 30 connection 31, and a phone 50 connection 51. A PC or data terminal 40 connects to the modem 30 with a PC connection 41. The manual unit 10 includes a three-position manually operated selector switch 11, a data mode lamp 12, and a transition button 13.

Referring to FIG. 4, the phone line 20 connects to a phone line termination 14, which in turn connects to a controllable three-position mode switch 15. A microprocessor controller 16 monitors the three-position selector switch 11.

If the selector switch 11 is placed in the modem position (M), the controller 16 sets the mode switch 15 to the modem position 23 which connects the modem 30 to the phone line 20 via the modem connection 31 and the line termination 14. The modem 30, in turn, connects to the PC or data terminal 40 via the PC connection 41. The controller 16 also lights the data mode lamp 12, which gives the user a visual indication that the unit 10 is configured to the data state.

This configuration provides a conventional data modem connection to the phone line since the modem 30 is connected to the phone line 20 through the unit 10, just as if there were a conventional modem arrangement.

In this way, the user can configure a conventional modem connection for data communications operations by placing the selector switch 11 in the modem position (M). This arrangement does not change until the user changes the selector switch 11 position.

If the selector switch 11 is manually placed in the phone position (P), the controller 16 senses and responds to the position of the switch 11 and sets the mode switch 15 to position 21 where it connects the phone 50 to the phone line 20 by way of the phone connection 51. This configuration provides a conventional phone connection to the phone line 20, and the unit 10 is in the voice state. The lamp 12 is also extinguished.

In this way, the user can configure a conventional voice phone arrangement for voice calls by placing the selector switch 11 in the phone position (P). This arrangement does not change until the user changes the selector switch 11 position.

When the user wishes to automatically transmit data within the context of a voice call, the user places the selector switch 11 in the automatic position (A). The unit is now capable of automatic transitions between voice and data according to whether either party wishes to transmit data or voice. This automatic capability requires both parties to have comparable units 10. Otherwise, in positions (M) or (P) conventional modem or phone communications can occur with any party or far end, regardless of whether they have one of these units 10.

FIG. 5 shows the states, transitions, events and actions for the unit 10 when operating in the automatic position A, and when automatically transitioning between voice and data operations. When the selector switch 11 is in the automatic position (A), the power-up and normal states are for voice (V) communication using the phone 50. The controller 16 puts the mode switch 15 in the phone position 21 connecting the phone 50 to the phone line 20. Upon entering the voice state, the controller 16 initializes an internal timing routine, referred to herein as the voice state timer. The controller 16 will not permit transition to the data state (D) until this timer has expired. In this way, a minimum interval for uninterrupted voice communication is assured, during which data communication interruptions are prevented.

When the user wishes to transmit data, the user facilitates this decision by depressing the transition button 13. The controller 16 senses this and directs the multi-tone generator 17 to generate a short burst of data transition tone over the phone line 20 toward the far end.

The controller 16 changes the mode switch 15 to the neutral position 22 so that neither the phone 50 nor the modem 30 is connected to the line 20 during transition. In this way, the units 10 at both ends are prevented from alternately being in the voice and data states, and spurious signals and noise are blocked.

A data transition tone is a unique, multitone signal that informs the far end that transition to data transmission operations is being requested by the near end. The use of a unique multitone signal maximizes the likelihood that transition will be accurately sensed only when intended, and that spurious noise, unintentional signals or background signals will not be mistaken for a transition tone. Carrier or other tones, which can occur spuriously in a network connection due to such factors as crosstalk, are not required to fill roles other than their primary purposes. The absence of carrier or other signals, which can be subject to network interruptions or interruptions caused by equipment, will not initiate unintended transitions. Similarly, there is minimum potential for unintended ambiguous states or transitions.

Commonly available chips which generate and detect Dual Tone Medium Frequency (DTMF) tones can be employed by using the high tones (A, B, C, D) which are not currently used in equipment normally connected to the phone line network. An even more secure solution can make use of modified DTMF chips that use unique frequency pairs using frequencies not currently in use.

The term "multitone" refers to the fact that multiple tone signals (similar in principle to those used with touchtone telephones) are proposed to reduce the likelihood of unintended transitions or actions as a result of spuriously generated single tones. The simultaneous generation of precisely the right multiple tones for the right amount of time (as in a telephone system) in the telecommunications environment is much less likely than the occasional occurrence of single tones, which can arise from random sources.

The term "unique" means a different multitone signal (a set of two frequencies) for each control signal. For example, one multitone is used to indicate a data transition tone, while a different multitone signal is used to indicate a data transition confirmation tone. In this way, there is never ambiguity over the intended control signal. Further, the term "unique" means different from any other multitone signaling used with existing telecommunications equipment prevalent in circuit switched connections in use today. For example, the A, B, C, and D tones are used only for military network signaling, and typically are not present in the public network. Using a multitone that is also available and used, such as for a DTMF digit, would create the potential for interference from crosstalk or erroneous inadvertent user actions.

The current A, B, C, o tones may be used. As alternatives, (1) the existing DTMF frequencies may be extended to their next higher members: 1885 and/or 1994 hz, (2) tone pairs from either the high group or low group may be used instead of requiring one tone from one and the other from the other group as is currently done with DTMF, or (3) three tones instead of two may be used.

The signal produced on the phone line 20 by the generator 17 is detected at the far or remote end by a multitone detector 18 in the unit (having the same construction as the unit 10) at the far end. The detector 18 at the far end causes the controller and the generator (corresponding to the components 16 and 17) at the far end to generate a data transition confirmation tone signal on the phone line 20. The far end controller also places the associated switch 15 in the modem position 23.

When the multi-tone detector 18 senses the data transition confirmation tone from the far end, the controller 16 detects this event, places the mode switch 15 in the modem position 23, lights the data mode lamp 12, and initializes an internal data state timing routine, which is the data state timer. The unit 10 is now in the data state (D), the modem 30 is connected to the phone line 20, and data communication activities can proceed.

The tone detector at the near end can also detect locally generated tone signals. This is not a problem, however, because the controller at the near end, knowing that tone is being generated locally, can mask off (or ignore) the local indication of tone detection while generating the tone. Alternatively, the controller at the near end may include means for disabling or disconnecting the detector from the circuit while locally generating tone at the near end.

The data transition confirmation tone is a unique multi-tone signal (different from the transition tone) that provides a definite, unambiguous confirmation. Other tones or spurious signals cannot be confused with it, and it carries a single meaning. This positive signal ensures a robust approach with maximum signaling integrity. Ambiguous states or transitions are thereby avoided.

The user can terminate data operations and return to the voice state by again depressing the transition button 13. The controller 16 senses this event, places the mode switch 15 in the neutral position 22, directs the multitone generator 17 to generate a short burst voice transition tone, and the data state timer is cleared.

The voice transition tone, once again, is a unique multi-tone signal (different from the others) that maximizes its accurate detection and minimizes the potential for spurious, unintended transitions. Similarly, there is no ambiguity over the transition intended, or its status.

Because the mode switch 15 is placed in the neutral position 22, mixed modes at the two ends and noise or spurious signals are avoided during transition.

The unit at the far end detects the voice transition tone signal, generates a voice transition confirmation tone signal and places the associated switch is in the phone position 21. The multi-tone detector 18 at the near end then detects the voice transition confirmation tone from the far end. The controller 16 senses this event, places the mode switch 15 in the phone position 21, extinguishes the data mode lamp 12 and initializes the internal voice state timer. At this point, the unit 10 has returned to the voice state (V).

A unique multi-tone voice transition confirmation tone signal is used to provide a positive confirmation of the transition by the far end. This avoids unintended transitions caused by spurious signals or circuits interruptions. This also minimizes the potential for ambiguous states or mixed modes between the two ends.

If while in the data state, the data state timer expires, the controller 16 senses this, and performs the same actions as if the user had depressed the transition button 13. Subsequent actions and events proceed as before to return to the voice state (V). In this way, data communication intervals are held to short periods of time that do not create undue breaks in voice conversations. Trains of thought, and continuous voice communications occur with only nominal interruptions for data.

If the data state timer expires, the controller senses this, places the mode switch 15 in the neutral position 22, directs the multitone generator 17 to generate a short burst of voice transition tone, and the data state timer is cleared. Upon detection of the subsequent voice transition confirmation tone from the far end by the multitone detector 18 at the near end, the controller 16 senses this event, places the mode switch 15 in the phone position 21, extinguishes the data mode lamp 12, and initializes the internal voice state timer.

Similarly, the far end unit can initiate a transition from voice to data by sending a short burst of data transition tone to the near end. The multi-tone detector 18 detects this signal, and the controller 16 in turn senses the event. The controller 16 then generates a short burst of data transition confirmation tone to the far end using the multi-tone generator 17, places the mode switch 15 in the modem position 23, lights the data mode lamp 12, and initializes the data state timer. As before, the unit 15 is now in the data state until a voice transition is initiated or the data state timer expires.

When in the data state, if a voice transition tone is detected from the far end by the multi-tone detector 18, the controller 16 senses this event, directs the multi-tone generator 17 to output a short burst of voice transition confirmation tone to the far end, extinguishes the data mode lamp 12, places the mode switch 15 in the phone position 21, clears the data state timer, and initializes the voice mode timer. The unit 10 is now in the voice state (V).

Connecting the phone line to the neutral mode switch position, instead of to the modem, when the data timer expires eliminates the carrier from the far end. This action causes an interruption of data communication activities by the P.C.

The manual unit 10 can be used with any modem and personal computer or data terminal, and does not depend on carrier operations or unique interfaces or signaling protocols for correct operation. The unit also does not require any complex signaling protocol, does not require any complex control codes or timing, and places no restrictions on user data.

With the voice mode and data mode timers, a good human factors design is provided that optimizes the user interface, and minimizes awkward or disruptive operational sequences of activity.

Automatic Unit

The automatic unit 10a shown in FIGS. 2, 6 and 7 can be used with any existing modem, and during data operations provides fully transparent data communications operations between the modem and PC, as if it were not an element of the configuration. For transitions and voice operations, it performs only those control functions necessary to ensure that the modem and PC do not attempt data communication operations that cannot be performed. The unit imposes no signaling, interface or protocol constraints on data communications, and supports totally unrestricted data communications. No restrictions are placed on user data, and special codes and other complexities are not required. Both data and voice operations are shielded by a protective signaling and control envelope. No additional signaling or control procedures are required to be performed by either the modem or the PC.

FIGS. 2 and 6 show the configuration for the automatic unit 10a. The automatic unit 10a terminates the phone line 20a, and provides a modem 30a connection 31a, and a phone 50a connection 51a. A PC or data terminal 40a connects to the unit 10a over a PC connection 41a, and an accompanying PC-modem connection 41' completes the connection between the PC and the modem. The automatic unit 10a includes the same three-position selector switch 11a, and a data mode lamp 12a, but the transition button 13 has been removed.

Referring to FIG. 6, which shows a more detailed block diagram for the automatic unit, most of the components are the same as for the manual unit. However, the manual transition button 13 has been removed and leads between the PC or data terminal 40a and the modem 30a are different.

The PC connection 41a from the PC now terminates at the unit 10 instead of the modem 30a. An accompanying connection, the modem cable 41' connects the modem 30a to the unit 10a, where the modem 30a previously connected to the PC 40a. In FIG. 6, both cables 41' and 41a are exploded to show that they consist of multiple leads within a single connecting cable. The ready to send (RTS) lead 19d and the clear to send (CTS) lead 19c from the PC or Data Terminal Equipment (DTE) terminate at the unit 10a, and the modem 30 RTS lead 19a and CTS lead 19b terminate at the unit 10a as well. All of the other leads in 41' and 41a are directly connected together by way of the unit 10a. The unit controller 16a monitors the PC/RTS lead 19d and controls the PC/CTS lead 19c. Conversely, the controller 16a monitors the modem CTS lead 19b and controls the modem RTS lead 19a.

As with the manual unit 10, if the selector switch 11a is placed in the modem or phone positions, the corresponding mode switch 15a configurations are maintained by the controller 16a.

If the selector switch 11a is placed in the modem position (M), the modem 30a is connected through the position 23a of the mode switch 15a to the phone line 20a via the modem connection 31a, the data mode lamp 12a is lit, and the modem RTS lead 19a and CTS lead 19b are kept in direct correspondence with the PC RTS lead 19d and CTS lead 19c. If the PC 40a sets or resets the RTS lead 19d, the controller 16a sets or resets the modem RTS lead 19a accordingly. If the modem 30a sets or resets the CTS lead 19b, the PC CTS lead 19c is set or reset accordingly. In this way, data communications can proceed as if the unit 10a were not present.

If the selector switch 11a is in the phone position (P), the phone 50a is connected through the position 22a of the mode switch 15a to the phone line 20a via the phone connection 51a, the data mode lamp 12a is off, the modem RTS lead 19a is held reset, and the PC CTS lead 19c is held reset. This conditions both the modem 30a and the PC 40a to sense that data communications are not permitted. Voice communications using the phone 50a can proceed just as if the unit 10 were not present, just as with the manual unit 10.

FIG. 7 shows the states, transitions, events and actions for when the selector switch 11a is in the automatic position (A). In this position, the automatic unit 10a permits the automatic transmission of data within the context of a voice call whenever the PC indicates that it has data ready to transmit. Similarly, the far end can effect automatic transitions between voice and data activities.

This embodiment does not require any particular modem, PC or modem interface, nor does it require software in the PC other than conventional data communications software. The terminology used, RTS and CTS, refers to RS-232C, which is the prevalent PC interface, but every such interface includes similar leads for communicating readiness between the PC and modem. Software can be used within the PC to maximize the likelihood that the desired data is transmitted within a minimum number of data intervals, for example, by minimizing disk reads. And it can also be used to facilitate retrieving the desired screens or files easily using an appropriate human factors design. But these modifications are not required.

As with the manual unit, when the selector switch 11a is in the automatic position, the normal and power-up states are voice. The controller keeps the mode switch 15a in the voice position 21a, connecting the phone 50a to the phone line 20a via the phone connection 51a. The modem RTS lead 19a and the PC CTS lead 19c are held reset. Upon entering the voice state, the controller initializes the voice state timer. The controller 16a will not permit transition to the data state until this timer has expired. In this way, a minimum interval for uninterrupted voice communication is assured, during which data operations are prevented.

Data transition is initiated by the PC RTS lead 19d changing from reset to set, and transition to voice by the PC RTS lead 19d changing from set to reset. Transitions are initiated by the far end as before. This will be explained in greater detail in the following paragraphs.

As mentioned earlier, transition to the data state is automatically initiated when the user actions at the PC 40a result in the PC RTS lead 19d changing from reset to set. In most respects, this has the same result as when the transition button 13 on the manual unit 10 is depressed. The controller 16a senses the PC RTS lead 19d change to set from reset, directs the multi-tone generator 17a to generate a data transition tone toward the far end, and changes the mode switch 15a to the neutral position 22a.

When the multi-tone detector 18a senses the data transition confirmation tone from the far end, the controller 16a detects this event, places the mode switch 15a in the modem position 23a, lights the data mode lamp 12a, initializes the data state timer, and sets the modem RTS lead 19a. The controller ensures that the PC RTS lead 19d and modem RTS lead 19a, and the PC CTS lead 19c and the modem CTS lead 19b, correspond to each other during the data state. The unit 10a is now in the data state, the modem 30a is connected to the phone line 20a, and data communications activities can proceed.

When user actions at the PC, or other PC events, occur that cause the PC RTS lead 19d to change from set to reset, this is sensed by the controller 16a as a request to terminate the data state and transition back to the voice state. The controller 16a places the mode switch 15a in the neutral position 22a, directs the multi-tone generator 17a to generate voice transition tone toward the far end, clears the data state timer, and resets the modem RTS lead 19a and the PC CTS lead 19c.

The multi-tone detector 18a then detects the voice transition confirmation tone from the far end. The controller 16a senses this event, places the mode switch 15a in the phone position 21a, extinguishes the data mode lamp 12a, and initializes the voice state timer. At this point, the unit 10a has returned to the voice state.

If the data state timer expires while in the data state, the controller 16a detects this, and executes the same appropriate sequence of actions to transition back to the voice state.

If the data state timer expires, the controller 16a senses this, resets the PC CTS lead 19c and the modem RTS lead 19a, places the mode switch 15a in the neutral position 22a, directs the multitone generator 17a to generate voice transition tone toward the far end, and clears the data state timer. The multitone detector 18a then detects the voice transition confirmation tone from the far end. The controller 16a senses this event, places the mode switch 15a in the phone position 21a, extinguishes the data mode lamp 12a, and initializes the voice state timer.

When switching from data transmission in the automatic unit, resetting the CTS lead, which is what the modem does when the carrier is lost from the far end, also results in an interruption of data communication activities by the PC. PC based software may be used to manage, or lessen any possible disruption of the data. An optional clock interrupt in the PC may be used to terminate data activities a short time prior to expiration of the data state timer.

While in the voice state, the far end can initiate a transition to the data state by sending a data transition tone to the near end. The multi-tone detector 18a senses this tone, and the controller 16a recognizes this event. The controller 16a generates a data transition confirmation tone to the far end using the multi-tone generator 17a, places the mode switch 15a in the modem position 23a, lights the data mode lamp 12a, initializes the data state timer, and ensures that the modem RTS lead 19a and the PC RTS lead 19d, and the modem CTS lead 19b and the PC CTS lead 19c correspond. The unit is now in the data state until a voice transition is initiated or a data state timer expires.

If a voice transition tone from the far end is detected by the multi-tone detector 18a while the local unit 10a is in the data state, the controller 16a senses this event, directs the multi-tone generator 17a to send voice transition confirmation tone toward the far end, extinguishes the data mode lamp 12a, place the mode switch 15a in the phone position 21a, clears the data state timer, initializes the voice state timer, and resets the modem RTS lead 19a and the PC CTS 19c lead. The unit 10a is now in the voice state, and voice communications can proceed.

Integrated Unit

Recognizing that currently available intelligent modems contain many of the capabilities required for the automatic unit 10a, as well as a microprocessor controller that not only monitors and controls modem elements, but also processes transmitted and received data, component efficiencies can be realized by integrating the intelligent modem and the automatic unit 10a into a single integrated unit. In this way, the integrated unit can operate as an intelligent data communication modem and automatically coordinate transitions and operation for both the voice and data modes. This eliminates redundant capabilities and circuit elements, provides all of the status and control information for both voice and data operations within a single controller, and simplifies the control interfaces and interactions needed to perform both functions.

FIGS. 3 and 8 show the configuration arrangement for the integrated unit 10c, including the phone line 20b, the phone 50b and the PC 40b.

FIG. 8 shows a block diagram of the integrated unit 10b showing those components of the prior art modem 30b within the dashed lines, and those that need to be added or modified to provide the additional capabilities of the automatic unit.

The intelligent modem provides the phone line termination 34b, a modulation/demodulator 33b, multi-tone generator circuitry 37b, and a controller 36b. Elements from the automatic unit that need to be added include the mode switch 15b, the multi-tone detector 18b, the selector switch 11b, the data mode lamp 12b, additional multi-tone generator capabilities 17b, and additional controller logic and timing routines 16b. While this block diagram suggests separate circuitry for multi-tone generation (37b and 17b) and control 36b and 16b, this actually represents added functionality using singular circuitry for these components.

In terms of the functions of the automatic unit, the integrated unit operates identically the same as the automatic unit. Because the same controller is used for both modem control and automatic unit control, a separate modem and separate connections between the modem and unit, and the unit and the PC are not necessary, as they were with the automatic unit configuration. The integrated unit has direct access within the controller to the same status and control information that drives the RTS and CTS leads used for automatic unit control.

Because the same controller monitors and controls all of the PC connection 41b leads, including the transmit data (T×D) and receive data (R×D) leads, modem and automatic unit control becomes integrated and unified. Control of voice and data states and transitions can be integrated more fully with modem control, and both forms of control can be coordinated with the other party more thoroughly. In particular, standard RS-232C inter-modem signaling can be greatly expanded. This will be explained more fully, but first a better explanation of the mechanisms for accomplishing this must be given.

As stated earlier, a current art intelligent modem monitors both transmitted and received data, and controls whether transmitted data from the PC is absorbed by the controller as local modem control or is transmitted to the far end as data. In a typical intelligent modem, when data transmission from the PC pauses for at least a second, followed by a resumption of data that is prefaced by special control characters, the subsequent data characters are interpreted by the controller as control commands. These special characters and control commands are not transmitted to the far end. After a similar pause and special control characters, subsequent data characters are passed to the far end modem. But this PC originated control is limited to the local modem.

By slight expansions of these mechanisms, expanded control can be provided between any two elements of a call, and the need for time delays to define transitions can be eliminated. For example, the local modem or PC can generate control messages to the distant modem or PC. And this can be accomplished transparently, or without any special control characters or user data restrictions. This can be done using framing bytes, or characters, and bit stuffing. These mechanisms have been used in data communications systems for years, and are important elements of the current technically advanced systems. But they are yet to be used with the generality and flexibility incorporated here, and are not yet used within the context of voice and asynchronous data communication through the public switched network.

Typical configuration models consider a Data Terminating Equipment (DTE—for example, a PC) at each end of a call connected to a Data Communication Equipment (DCE—for example, a modem). The DTEs communicate with the DCEs, which in turn manage data communication through the network connection between them. This is not a unified peer-to-peer configuration; DCE to DCE control occurs on individual point-to-point links, a local DTE cannot control a remote DCE, and there is no concept of intermediate DCEs between the DCEs at the circuit end points that can be controlled by either end point DTE.

As an example of limitations imposed by such configuration models, the DTe-DCE control available with intelligent modems is far more extensive than that available with standardized DCE-DCE handshake protocols such as RS-232C. Another example consists of a voice and data conference calling arrangement where a PC (DTE) and modem (DCE) reside at each party, with a conference circuit (DCE) at an intermediate point. The initiation of the call, and the control of voice and data transitions can require calling or called party control of the conference circuit. Or stated another way, an endpoint DTE needs control of a remote intermediate DCE.

Transition tones can optionally be expanded to include a unique set used by Integrated Units to indicate at transition that they are capable of expanded control signaling. Every Unit can then indicate to other units whether or not they are capable of expanded signaling in the process of executing transitions. Each unit will similarly be capable of detecting both sets of tones, regardless of whether they are capable of expanded signaling. In this way, all units are compatible for the basic voice and data operations, and Intelligent Units know whether other units that are involved in a particular call can process the signaling. If not, operations are confined to basic capabilities. If so, expanded signaling can be used.

For the expanded signaling, control message framing bytes are used; a zero byte marks the beginning of a control message, and a byte of all ones marks the end. A unit inserts a control message into the serial data stream by inserting a zero byte, the control message, and a byte of all ones. The unit protects these framing bytes by bit-stuffing message contents and user data. Any seven consecutive ones have a zero bit inserted after them, and seven zeros have a one bit inserted immediately after them. These operations can be performed on the data stream by hardware, firmware or software.

A unit detects a control message by checking the received data stream for eight consecutive zeros, and all bits after these zeros up to the first all ones byte constitute a control message. If the unit is the target of the control message, the control message is unstuffed (trailing stuffed ones and zeros are deleted) to obtain the clear message. Other messages, with their framing bytes are passed on to the next consecutive, or end point, unit. A data destination unit unstuffs the transmitted data, otherwise it is passed through transparently. In those situations where protocols use all zeros or all ones as idle code, the message start and end framing bytes can be reversed to remain compatible.

Control messages have as initial message elements an origination unit identifier and a destination unit identifier. In this way, units can identify their messages, and the destinations for their messages. Target units can use the origination identifier to address response or confirmatory messages.

In this way, uniform, peer-to-peer control messaging can be accomplished between any units with minimal serial data stream processing, no restrictions on user data content, and no requirements for timing or delays and special characters to delimit control messages. This messaging scheme can be employed by DTEs including personal computers and DCEs including intelligent modems, in particular, the Integrated Unit.

While this messaging mechanism will be used for advanced control capabilities beyond those available in contemporary systems, this approach lends itself well to environments and applications where interworking compatibility with Integrated services Digital Network (ISDN), System Network Architecture (SNA), Netview and Netview PC is required.

As used herein, the phrase "shielded by a protective signaling and control envelope" refers to the fact that neither voice nor data communication activities can occur until the preliminary transition request and confirmation tones signaling procedures are completed. If one could freeze a time sequence of alternating voice and data activities over time, each voice interval would have a transition sequence in front of it and behind it, separating it from data activities. Similarly, every data interval would have a transition sequence in front of it and behind it.

Controllers available for use in this invention include off-the-shelf Motorola 6500 and 6800, and the Intel 8080 microprocessor series.

Voice/Data/Answer Unit

FIG. 9 shows the integrated unit of FIG. 8 with a record/playback unit 24 connected to the telephone connector 51b, and to the controller 16b. The record/playback unit 24 and the controller 16b effectively duplicate the functions of an answering machine, but in an integrated and coordinated fashion. For example, if the phone does not go off-hook within a certain number of rings on an incoming call, the controller may direct the record/playback to go off-hook, playback a prerecorded message, and begin recording the incoming analog voice message. FIG. 10 shows the answer flow logic that may occur from this point in call answer. If no transitions are signaled, message recording continues until disconnect. Transitions may occur just as before with the other units with the exception of two differences. The controller 16b controls the record/playback unit 24 to record when in the voice mode, and to stop recording when in the data mode, or when in transition. Since there is no two-party conversation, and the call may be a data-only call, the data state timer may be disabled to permit a data state period of any duration. Transition to voice may occur, but only in response to a user action or data terminal status change.

In this way, the unit may record voice when in the voice answering mode, or may connect the modem for data communications when indicated by transition tones, using a single phone line. Recording of data communications is avoided, and answering machine functions are available for voice calls. Mixed calls consisting of voice and data may also be supported.

The record playback unit may be a conventional analog unit, or a digitizer and computer port, or any other controllable circuitry capable of recording and playing back messages under controller 16b control.

What is claimed is:

1. Apparatus for transmitting analog voice and data communications on a phone line utilizing a telephone, a data terminal and a modem, the modem being connected to the data terminal, said apparatus comprising:
    (a) a mode switch adapted to be connected to the phone line, to the modem and to the telephone, said mode switch having at least first and second positions, when in said first position the phone line being connected to the modem and the telephone being disconnected and when in the second position the phone line being connected to the telephone and the modem being disconnected;
    (b) a controller connected to said mode switch for placing said mode switch in said first position or in said second position;
    (c) a data transition tone generator connected to said controller and adapted to be connected to the phone line; and
    (d) a transition button means for actuating said tone generator to produce a unique tone signal other than modem carrier on the phone line just prior to the time that said controller changes the position of said mode switch.

2. Apparatus as set forth in claim 1, wherein said transition button comprises an electronic or mechanical or optical actuator.

3. Apparatus as set forth in claim 1, and further including a data state timer means for actuating said tone generator, said data state timer means repeatedly operable for the duration of the call connection.

4. Apparatus as set forth in claim 1, and further including a tone detector connected to said controller and adapted to be connected to the phone line, said tone detector being operable to detect said unique tone signal other than modem carrier on the phone line and actuate said controller to change the position of said mode switch.

5. Apparatus as set forth in claim 4, wherein said tone detector is further operable to cause said tone generator to produce a unique confirmation tone signal other than modem carrier on the phone line.

6. Apparatus as set forth in claim 5, wherein said unique tone signal and said unique confirmation tone signal comprise dual-tone signals.

7. Apparatus for transmitting analog voice and data communications on a phone line utilizing a telephone, a data terminal and a modem, the modem being connected to the data terminal, said apparatus comprising:
    (a) a mode switch adapted to be connected to the phone line, to the modem and to the telephone, said mode switch having at least first and second positions, when in said first position the phone line being connected to the modem and when in the second position the phone line being connected to the telephone;
    (b) a controller connected to said mode switch for placing said mode switch in said first position or in said second position;
    (c) a data transition tone generator connected to said controller and adapted to be connected to the phone line; and
    (d) a transition button means for actuating said tone generator to produce a tone signal on the phone line just prior to the time that said controller changes the position of said mode switch,
said mode switch further having a neutral position, and said controller being operable to place said mode switch in said neutral position while said tone generator is producing said tone signal.

8. Apparatus for transmitting analog voice and data communications on a phone line utilizing a telephone, a data terminal and a modem, the modem being connected to the data terminal, said apparatus comprising:
    (a) a mode switch adapted to be connected to the phone line, to the modem and to the telephone, said mode switch having at least first and second positions, when in said first position the phone line being connected to the modem and the telephone being disconnected and when in the second position the phone line being connected to the telephone and the modem being disconnected;
    (b) a controller connected to said mode switch for placing said mode switch in said first position or in said second position;
    (c) a data transition tone signal generator connected to said controller and adapted to be connected to the phone line; and
    (d) said controller including a data state timer means for automatically causing said generator to produce a unique tone signal other than modem carrier on the phone line and causing said mode switch to move from said second position to the said first position, said data state timer means repeatedly operable for the duration of the call connection.

9. Apparatus as set forth in claim 8, wherein said unique tone signal comprises a dual tone signal.

10. Apparatus as set forth in claim 8, and further including a tone signal detector for responding to said tone signal other than modem carrier and moving said mode switch from one of said positions to the other of said positions, and a confirmation tone signal generator responsive to said tone signal detector for generating a unique confirmation tone signal other than modem carrier on said phone line in response to receipt of a transition tone signal, said confirmation tone generator repeatedly operable during the duration of the call.

11. Apparatus as set forth in claim 8, and further including
   (e) a control means for maintaining known and compatible states in said data terminal and said modem during voice and data states and state transitions and while said modem is disconnected or connected to the phone line.

12. Apparatus for transmitting analog voice and data communications on a phone line utilizing a telephone, a data terminal and a modem, the modem being connected to the data terminal, said apparatus comprising:
   (a) a mode switch adapted to be connected to the phone line, to the modem and to the telephone, said mode switch having at least first and second positions, when in said first position the phone line being connected to the modem and when in the second position the phone line being connected to the telephone;
   (b) a controller connected to said mode switch for placing said mode switch in said first position or in said second position;
   (c) a data transition tone signal generator connected to said controller and adapted to be connected to the phone line; and
   (d) said controller including a data state timer means for automatically causing said generator to produce a tone signal on the phone line and causing said mode switch to move from one of said positions to the other of said positions,
said data state timer means comprising a data state timer for automatically moving said switch from said second position to said first position at a predetermined timing period.

13. Apparatus for transmitting analog voice and data communications on a phone line utilizing a telephone, a data terminal and a modem, the modem being connected to the data terminal, said apparatus comprising:
   (a) a mode switch adapted to be connected to the phone line, to the modem and to the telephone, said mode switch having at least first and second positions, when in said first position the phone line being connected to the modem and when in the second position the phone line being connected to the telephone;
   (b) a controller connected to said mode switch for placing said mode switch in said first position or in said second position;
   (c) a data transition tone signal generator connected to said controller and adapted to be connected to the phone line; and
   (d) said controller including a data state timer means for automatically causing said generator to produce a tone signal on the phone line and causing said mode switch to move from one of said positions to the other of said positions,
said controller further including a voice state timer for preventing said controller from moving said mode switch from said first position to said second position until after a predetermined timing period.

14. Apparatus for transmitting analog voice and data communications on a phone line utilizing a telephone, a data terminal and a modem, the modem being connected to the data terminal, said apparatus comprising:
   (a) a mode switch adapted to be connected to the phone line, to the modem and to the telephone, said mode switch having at least first and second positions, when in said first position the phone line being connected to the modem and the telephone being disconnected and when in the second position the phone line being connected to the telephone and the modem being disconnected;
   (b) a controller connected to said mode switch for placing said mode switch in said first position or in said second position;
   (c) a data transition tone generator connected to said controller and adapted to be connected to the phone line; and
   (d) a computer connected to said modem and to said controller for causing said generator to produce a unique tone signal other than modem carrier on the phone line and causing said mode switch to move from one of said positions to the other of said positions.

15. Apparatus as set forth in claim 14, wherein said computer causes said mode switch to be placed in said first position.

16. Apparatus as set forth in claim 15, and further including a record/playback means with said controller connected to said record/playback means and a control means for controlling said record/playback means to answer an incoming call, playback, record, and stop recording.

17. Apparatus as set forth in claim 14, wherein said tone signal comprises at least two tones.

18. Apparatus as set forth in claim 14, and further including a record/playback means with said controller connected to said record/playback means and a control means for controlling said record/playback means to answer an incoming call, playback, record, and stop recording.

19. Apparatus as set forth in claim 14, and further including
   (e) a control means for maintaining known and compatible states in said data terminal and said modem during voice and data states and state transitions and while said modem is disconnected or connected to the phone line.

20. Apparatus for transmitting analog voice and data communications on a phone line utilizing a telephone, a data terminal and a modem, the modem being connected to the data terminal, said apparatus comprising:
   (a) a mode switch adapted to be connected to the phone line, to the modem and to the telephone, said mode switch having at least first and second positions, when in said first position the phone line being connected to the modem and when in the second position the phone line being connected to the telephone;
   (b) a controller connected to said mode switch for placing said mode switch in said first position or in said second position;
   (c) a data transition tone generator connected to said controller and adapted to be connected to the phone line; and (d) a transition button means for actuating said tone generator to produce a tone signal on the phone line just prior to the time that said controller changes the position of said mode switch, said mode switch further including a neutral position wherein said phone line is disconnected from said telephone and said modem, and said tone generator produces said tone signal when said mode switch is in said neutral position.

21. Apparatus for transmitting analog voice and data communications on a phone line utilizing a telephone, a data terminal and a modem, the modem being connected to the data terminal, said apparatus comprising:

(a) a mode switch adapted to be connected to the phone line, to the modem and to the telephone, said mode switch having at least first and second positions, when in said first position the phone line being connected to the modem and when in the second position the phone line being connected to the telephone;

(b) a controller connected to said mode switch for placing said mode switch in said first position or in said second position;

(c) a data transition tone signal generator connected to said controller and adapted to be connected to the phone line; and (d) said controller including a data state timer means for automatically causing said generator to produce a tone signal on the phone line and causing said mode switch to move from one of said positions to the other of said positions, said mode switch further including a neutral position wherein said phone line is disconnected from said telephone and said modem, and said tone generator produces said tone signal when said mode switch is in said neutral position.

22. Apparatus for transmitting analog voice and data communications on a phone line utilizing a telephone, a data terminal and a modem, the modem being connected to the data terminal, said apparatus comprising:

(a) a mode switch adapted to be connected to the phone line, to the modem and to the telephone, said mode switch having at least first and second positions, when in said first position the phone line being connected to the modem and when in the second position the phone line being connected to the telephone;

(b) a controller connected to said mode switch for placing said mode switch in said first position or in said second position;

(c) a data transition tone generator connected to said controller and adapted to be connected to the phone line; and (d) a computer connected to said modem and to said controller for causing said generator to produce a tone signal on the phone line and causing said mode switch to move from one of said positions to the other of said positions, said mode switch further including a neutral position wherein said phone line is disconnected from said telephone and said modem, and said tone generator produces said tone signal when said mode switch is in said neutral position.

23. Apparatus as set forth in claim 22, and further including a record/playback means with said controller connected to said record/playback means and a control means for controlling said record/playback means to answer an incoming call, playback, record, and stop recording.

24. A method of transmitting data and voice communications over a phone line between a near end and a remote end, comprising the steps of (a) connecting a mode switch, a controller, a modem and a telephone to said phone line at said near end, and a similar mode switch, a controller, a modem and a telephone to said phone line at said remote end;

(b) initializing communications between said near end and said remote end with said mode switch at said near end connecting said telephone at said near end to said phone line and disconnecting said modem at said near end, and said mode switch at said remote end connecting said telephone at said remote end to said phone line and disconnecting said modem at said remote end;

(c) actuating said controller at said near end to generate a unique transition signal other than modem carrier on said phone line and disconnecting said telephone at said near end from said phone line;

(d) detecting said transition signal by said controller at said remote end and generating a unique confirmation signal other than modem carrier on said phone line and moving said mode switch at said remote end to connect said modem at said remote end to said phone line and disconnecting said telephone at said remote end; and (e) detecting said confirmation signal by said controller at said near end and moving said mode switch at said near end to connect said modem at said near end to said phone line.

25. A method of transmitting data and voice communications over a phone line between a near end and a remote end and recording the voice communications at said remote end comprising the steps of (a) connecting a mode switch, a controller, a modem and a telephone to said phone line at said near end, and connecting a similar mode switch, a controller, a modem and a telephone, and a record/playback unit to said phone line at said remote end;

(b) at said near end originating a call to said remote end with said mode switch connecting said phone to said phone line and disconnecting said modem from said phone line;

(c) at said remote end said controller detects ringing and answers with said mode switch connecting said phone and said record/playback unit to said phone line and disconnecting said modem from said phone line, and actuating said record/playback unit to begin recording;

(d) at said near end actuating said controller to generate a unique transition signal other than modem carrier on said phone line and disconnect said telephone from said phone line;

(e) at said remote end detecting said transition signal by said controller and said controller generating a unique confirmation signal other than modem carrier on said phone line, moving said mode switch to connect said modem to said phone line and disconnect said phone and said record/playback unit from said phone line, and actuating said record/playback unit to stop recording; and (f) at said near end detecting said confirmation signal by said controller and moving said mode switch to connect said modem to said phone line and disconnect said phone from said phone line.

26. Apparatus for transmitting analog and data communications on a phone line utilizing a telephone, a data terminal or computer and a modem, the modem being connected to the data terminal, said apparatus comprising:
- (a) a mode switch adapted to be connected to the phone line, to the modem and to the telephone, said mode switch having first, second and third positions, when in said first position the phone line being connected to the modem, when in said second position the phone line being connected to the telephone and when in said third position the phone line being disconnected from the modem and the telephone;
- (b) a controller connected to said mode switch for placing said mode switch in said first position, said second position or in said third position;
- (c) a tone generator connected to said controller and adapted to be connected to the phone line;
- (d) a first control means for causing said generator to produce a tone signal on the phone line and causing said mode switch to move from one of said positions to the other of said positions;
- (e) a second control means for maintaining known and compatible states in said data terminal and the modem during voice and data states and state transitions, and while said modem is connected and disconnected from the phone line;
- (f) a data state timer means for automatically returning from the data state to the voice state after a predetermined timing period;
- (g) a voice state timer means for remaining in the voice state until a predetermined time interval has expired; and
- (h) a tone detector connected to said controller and adapted to be connected to the phone line, said tone detector being operable to detect a tone signal on the phone line and actuate said controller to change the position of said mode switch and to cause said tone generator to produce tone signals on the phone line.

* * * * *